(12) United States Patent
Meng

(10) Patent No.: US 8,017,917 B2
(45) Date of Patent: Sep. 13, 2011

(54) IONIZING RADIATION SENSOR

(75) Inventor: Ling-Jian Meng, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 80 days.

(21) Appl. No.: 12/259,139

(22) Filed: Oct. 27, 2008

(65) Prior Publication Data

US 2009/0140157 A1 Jun. 4, 2009

Related U.S. Application Data

(60) Provisional application No. 60/983,438, filed on Oct. 29, 2007.

(51) Int. Cl.
*G01T 1/20* (2006.01)

(52) U.S. Cl. ............. 250/370.11; 250/207; 250/214 VT; 250/363.04

(58) Field of Classification Search ............. 250/363.04, 250/207, 214 VT, 370.09
See application file for complete search history.

(56) References Cited

U.S. PATENT DOCUMENTS

| | | | | |
|---|---|---|---|---|
| 3,531,651 A | * | 9/1970 | Lieber et al. | 250/361 R |
| 3,890,506 A | * | 6/1975 | Berninger | 250/370.09 |
| 4,095,107 A | * | 6/1978 | Genna et al. | 250/363.04 |
| 5,138,642 A | * | 8/1992 | McCroskey et al. | 378/19 |
| 5,381,000 A | * | 1/1995 | McKee, Jr. | 250/214 VT |
| 7,082,186 B2 | * | 7/2006 | Zhao et al. | 378/57 |
| 2007/0236094 A1 | * | 10/2007 | Kaminski et al. | 310/156.28 |

OTHER PUBLICATIONS

Meng, L.J., "An Intensified EMCCD Camera for Low Energy Gamma Ray Imaging Applications," IEEE Transactions on Nuclear Science, vol. 53, No. 4, pp. 2376-2383, published Aug. 2006; Retrieved from the Internet [Dec. 8, 2010]; Retrieved from URL <http://radimg.ne.uiuc.edu/journal_papers/iemccd.pdf>.*

Nagarkar et al., "A CCD-Based Detector for SPECT", p. 2449-2452, IEEE Xplore. Oct. 15, 2008.

Stanford et al., "The Noise Performance of Electron Multiplying Charge-Coupled Devices", p. 1227-1232, IEEE Transactions on Electron Devices, vol. 50. No. 5, May 2003.

* cited by examiner

*Primary Examiner* — David Porta
*Assistant Examiner* — Yara Green
(74) *Attorney, Agent, or Firm* — Guntin, Meles & Gust, PLC; Ed Guntin

(57) ABSTRACT

A system that incorporates teachings of the present disclosure may include, for example, an ionizing radiation sensor having a first scintillator for generating photons from incoming ionizing radiation, an imaging intensifier for amplifying the photons, and an electron-multiplying charge-coupled device (EMCCD) coupled to the imaging intensifier for sensing the amplified photons generated by the imaging intensifier. Additional embodiments are disclosed.

34 Claims, 14 Drawing Sheets

US 8,017,917 B2

IONIZING RADIATION SENSOR

CROSS REFERENCE TO RELATED APPLICATIONS

The present application claims the benefit of priority to U.S. Provisional Application No. 60/983,438 filed on Oct. 29, 2007, which is hereby incorporated herein by reference.

STATEMENT AS TO FEDERALLY SPONSORED RESEARCH

This invention was made with government support under EB004940-01 awarded by the National Institute of Health, and under R33 004940-05 awarded by the National Institute of Biomedical Imaging and BioEngineering. The government has certain rights in this invention.

FIELD OF THE DISCLOSURE

The present disclosure relates generally to radiation sensors, and more specifically to an ionizing radiation sensor.

BACKGROUND

In recent years substantial efforts have been made to improve the imaging capability of Single-Photon Emission Computed Tomography (SPECT) systems for mapping the distribution of radio-labeled molecules. Recent developments in small animal SPECT have benefited from advances in gamma ray sensor technologies. Examples of recently developed detector technologies include high resolution CdZnTe (CZT) and CdTe detectors, multi-pixel Hybrid PhotoDiode (M-HPD) detectors, double-sided silicon strip sensors, silicon draft diode (SDD) detectors, electron-multiplying charge-coupled device (EMCCD) based mini gamma cameras, avalanche photodiode (APD) array detectors, and solid-sate photomultipliers (SSPM)—just to mention a few.

Figure 1:
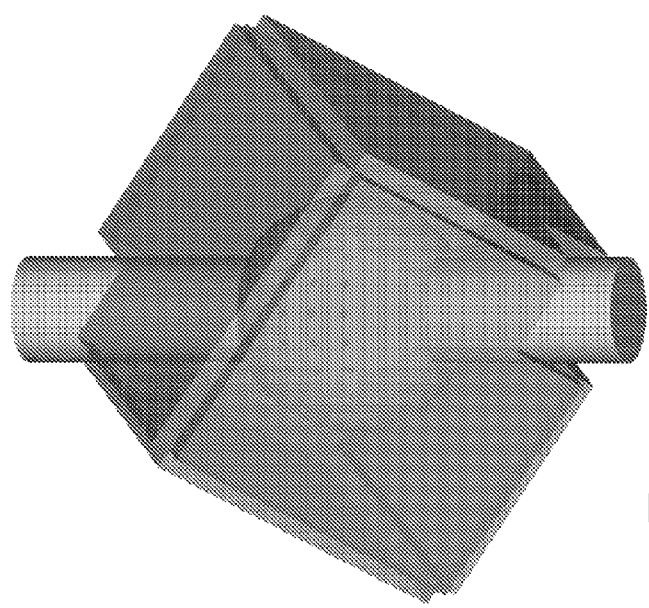
FIG. 1 depicts an illustrative embodiment of a schematic of a Gamma-Cube system. The illustration consists of six large area gamma ray sensors and a spherical aperture system with (150-300) pinholes.

Table 1 depicts an illustrative embodiment of Raw Detection Efficiency Offered by the Spherical Aperture with Pinhole and Ring-hole Openings; and Table 2 depicts an illustrative embodiment of Measured Detector Intrinsic Spatial Resolutions.

DETAILED DESCRIPTION

One embodiment of the present disclosure entails an ionizing radiation sensor having a first scintillator for generating photons from incoming ionizing radiation, an imaging intensifier for amplifying the photons, and an electron-multiplying charge-coupled device (EMCCD) coupled to the imaging intensifier for sensing the amplified photons generated by the imaging intensifier.

Another embodiment of the present disclosure entails an ionizing radiation sensor having a scintillator for generating photons from incoming ionizing radiation, an imaging intensifier for generating accelerated electrons from the photons, and an EMCCD coupled to the imaging intensifier for sensing the accelerated electrons generated by the imaging intensifier. In this embodiment, the vacuum housing assembly can have a geometric shape corresponding to one of a cylindrical shape, and a hexagonal shape. The entrance window can also have a fiber optic plate. At least a portion of the EMCCD can be located inside the vacuum housing assembly for sensing the accelerated electrons. A substrate having an inner surface can be electrically coupled to the EMCCD, and an outer surface can supply a plurality of signal connections associated with the EMCCD. The EMCCD can be located inside the vacuum housing assembly. The substrate can support the EMCCD in the vacuum housing assembly and can be structurally part of the vacuum housing assembly to create a vacuum seal.

Another embodiment of the present disclosure entails a monitor having a controller to monitor signals supplied by an ionizing radiation sensor that senses one of amplified photons and accelerated electrons generated from incoming ionizing radiation. The ionizing radiation sensor can have a first scintillator for generating photons from incoming ionizing radiation, an imaging intensifier for amplifying the photons, and an EMCCD coupled to the imaging intensifier for sensing the amplified photons generated by the imaging intensifier. In another embodiment, the ionizing radiation sensor can have a scintillator for generating photons from incoming ionizing radiation, an imaging intensifier for generating accelerated electrons from the photons, and an EMCCD coupled to the imaging intensifier for sensing the accelerated electrons generated by the imaging intensifier.

Another embodiment of the present disclosure entails a computer-readable storage medium having computer instructions for analyzing signals supplied by an ionizing radiation sensor that senses one of amplified photons and accelerated electrons created from incoming ionizing radiation.

Another embodiment of the present disclosure entails a sensor having a plurality of ionization radiation sensors, wherein at least a portion of the plurality of ionization radiation sensors are aligned in intersecting planes. The intersecting planes can be orthogonal to each other. The plurality of ionizing radiation sensors can sense one of amplified photons and accelerated electrons generated from incoming ionizing radiation. At least one of the plurality of ionization radiation sensors can have one of a first generation imaging intensifier, and a second generation imaging intensifier. In another embodiment, at least one of the plurality of ionizing radiation sensors can have a scintillator for generating photons from incoming ionizing radiation, an imaging intensifier for generating accelerated electrons from the photons, a fiber taper and fiber stud coupled to an output window of the imaging intensifier, and an electron-multiplying charge-coupled device (EMCCD) coupled to the fiber stud for sensing the amplified photons generated by the imaging intensifier.

In another embodiment, at least one of the plurality of ionizing radiation sensors can have a first scintillator for generating photons from incoming ionizing radiation, an imaging intensifier for amplifying the photons, and an EMCCD coupled to the imaging intensifier for sensing the amplified photons generated by the imaging intensifier. In yet another embodiment, at least one of the plurality of ionizing radiation sensors can have a scintillator for generating photons from incoming ionizing radiation, an imaging intensifier for generating accelerated electrons from the photons, and an EMCCD coupled to the imaging intensifier for sensing the accelerated electrons generated by the imaging intensifier.

The present disclosure describes in one embodiment a design of an ultrahigh resolution single photon emission computed tomography (SPECT) system. The SPECT system can consist of two components—a Gamma-Cube system design and a possible gamma ray sensor technology for use in the Gamma-Cube system.

The Gamma-Cube System

A basic design of the Gamma-Cube system is illustrated in FIG. 1. It can consist of 6 detectors (each roughly 6 cm×6 cm to 10 cm×10 cm in size), arranged in a cubic configuration with a minimum gap between sensors. A truncated spherical aperture system can be located at the center of the system with multiple pinhole or ring-hole openings. An object supported on a horizontal bed can be transported into the system of FIG. 1 from an open corner of the cube. Several design aspects of this system are discussed below.

The Cubic Detector System

Six Gamma-Cube detectors can cover approximately 85% of a solid angle from a center of an object under observation. When coupled to a truncated spherical aperture, this configuration allows for an acquisition of projections from multiple orthogonal view angles that are more evenly distributed across a wide solid angle. Although a completely spherical detector system may serve better for this purpose, covering detection areas around the object with six planar detectors is relatively easy to implement. In the Gamma-Cube system of FIGS. 1 and 2, each detector can be 6 cm×6 cm to 10 cm×10 cm in size. Possible detectors include an intensified EMCCD detector outlined below or other large area gamma ray detectors having sufficient spatial resolution (50-500 µm). For objects of 3 cm in diameter to move in and out of the system of FIG. 1, each detector has part of its detection area removed as shown in FIG. 1. The detectors can be installed on a cubic gantry that allows them to be moved back and forth from the center. Although detectors can be closely packed for most animal studies, a bore of the system can be widened by retreating the detectors slightly from their normal positions. With the use of spherical apertures of larger diameters, large animals (such as rats) may be imaged in the system.

The Spherical Aperture System

Figure 2:
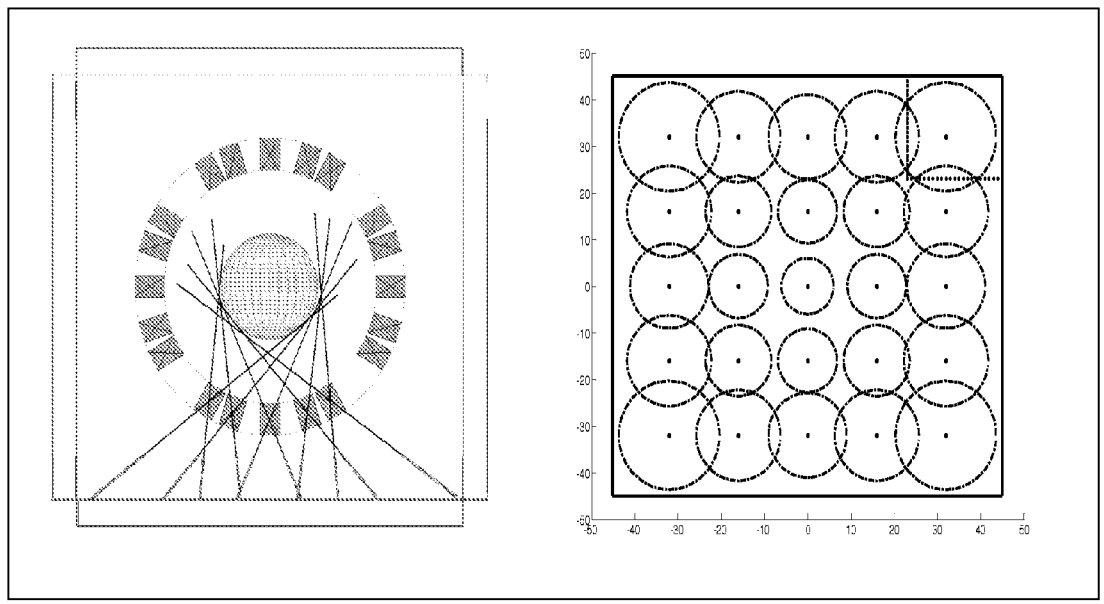
FIG. 2 depicts an illustrative embodiment of a cross section view (left) of the system gamma-cube system of FIG. 1, and a projection of a spherical object of 2 cm diameter on to the detector (right)

A truncated spherical aperture system can be used in the Gamma-Cube system. This embodiment can provide an angular coverage that is as wide and uniform as possible, without introducing too much multiplexing. The aperture system can consist of a spherical shell of 5-7 cm in diameter. It can be truncated on both ends to allow the object to enter. A body of the shell can have 150 or 300 through-holes to allow pre-fabricated inserts to be placed into these holes. The axes of pinhole or ring-hole inserts can be pointing to a center of the system. An open angle of the pinholes or ring-hole openings can be designed so that the field of views (FOVs) of all pinholes (or ring-holes) converge to a central spherical area of 2 cm in diameter. A cross section view of the spherical aperture system is illustrated in FIG. 2. This aperture can be a total of 150 pinholes.

The projection of an object sphere of 2 cm in diameter on a detector is also illustrated in FIG. 2. To achieve an adequate detection efficiency, two types of openings can be used on the aperture. A total of 150 or 300 standard pinholes (of 200-300 µm in diameter) can be used in the aperture. These pinholes can be distributed on the spherical aperture surface that covers approximately 75% of the total $4\pi$ solid angle. Given the symmetry in the system design, the central spherical volume of 2 cm diameter in an object can project similar patterns on each detector as shown in the right panel of FIG. 2. This aperture configuration can provide a sensitivity that is almost 10 times greater than that offered by a dual-headed system. This aperture can be used with a wide range of isotopes (such as I-125, I-123, Tl-201, Tc-99m etc.) that emit gamma rays with 27-200 keV energy.

Figure 3:
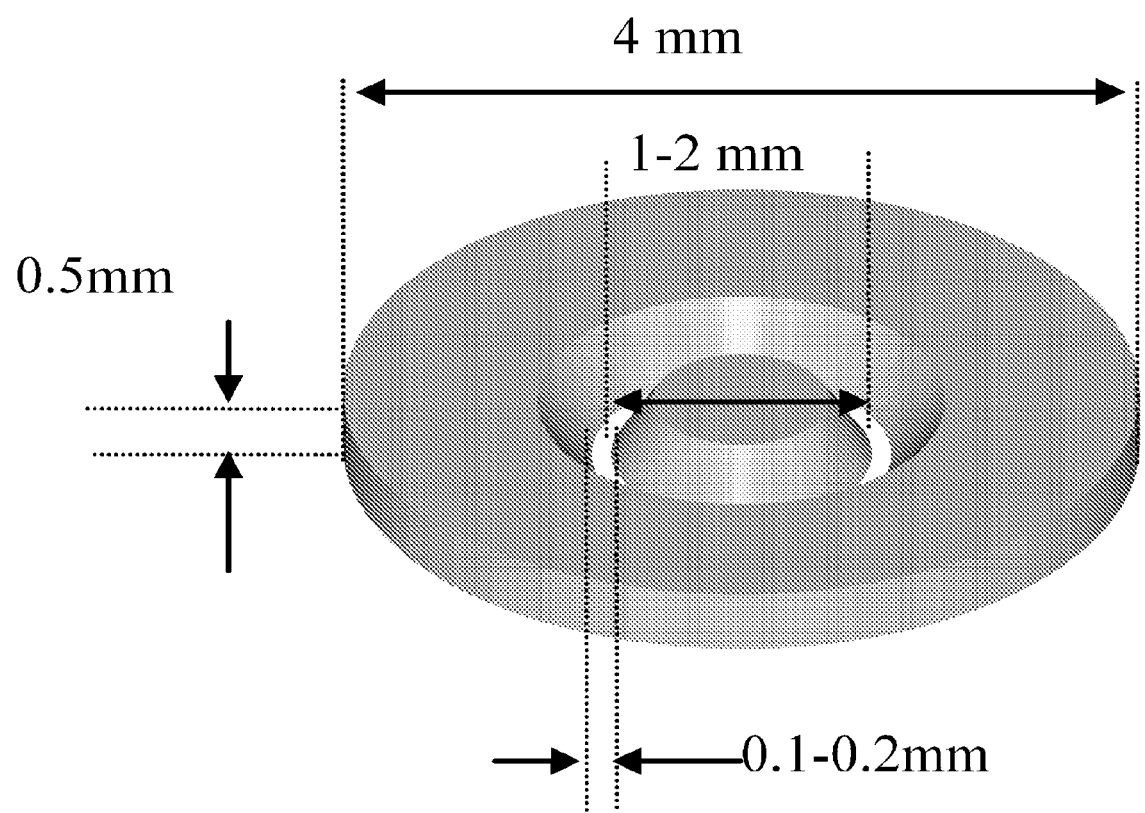
FIG. 3 depicts an illustrative embodiment of ring-hole inserts for I-125 imaging applications. The ring opening is typically 100-200 μm. The opening angle of the aperture can range from 60 degrees or 90 degrees.

For I-125 studies, it is also possible to use ring-hole inserts to further improve the detection efficiency of the Gamma-Cube system. These ring-hole inserts can be made of tungsten sheets of 500 µm in thickness, as shown in FIG. 3. Some possible designs of the ring-hole aperture are shown in Table 1. With the use of these ring-hole apertures, the detection efficiency can be improved as high as 1-3% at a center of the FOV. Unfortunately, the ring-hole collimator may not be applicable for gamma rays at higher energies, such as 140 keV, due to geometrical constraints. The use of ring-hole aperture can introduce a greater amount of multiplexing and therefore a tradeoff can arise for decoding projection data. A sensitivity offered by the spherical aperture with 150 or 216 inserts is shown in Table 1.

The Intensified Electron-Multiplying Charge-Coupled Device (I-EMCCD)

An EMCCD is a detector technology that can be used in the Gamma Cube system of FIG. 1. Current I-EMCCD detectors use a single X/gamma ray photon counting camera. These sensors are similar, in structure, to conventional CCDs except that a series of multiplying registers are added before the readout amplifier. The multiplying registers can amplify the charge signal by a factor of up to several tens of thousand using a phenomena known as "impact ionization", which is described in M. S. Robbins and B. J. Hadwen, "The noise performance of electron multiplying charge-coupled devices", IEEE Trans. Electron Devices, Vol. 50(5), pp. 1227-1232, 2003. The foregoing design effectively eliminates electronic noise associated with conventional CCDs (especially with fast-scan CCDs). As a result, EMCCDs can offer a readout rate of up to 35 MHz, while having an effective readout noise of <1 electrons RMS per pixel. Standard CCDs at similar readout rates would have a readout noise of 40 electrons or more.

A combination of high spatial resolution, high frame rate and low effective readout noise makes the EMCCD a useful device for gamma ray imaging applications. Several groups have proposed or experimentally tested imaging systems based on this device. Unfortunately, currently available sensors are relatively small (typically 8×8 mm² in size). To construct a detector with a reasonable active area, Nagarkar et al, "A CCD-based detector for SPECT," *IEEE Trans. Nucl. Sci.*, vol. 53, pp. 54-58, 2006 have developed a detector system that uses an optical lens to couple a scintillation array to an EMCCD device. A major limitation of this design is the low coupling efficiency between the scintillator and the EMCCD sensor, which has been measured to be 0.7~0.07%. In present applications (of imaging at ~30 keV), each gamma ray stopped in the phosphor produces only a few hundred photons. After coupling to the EMCCD sensor, the remaining photons may also be shared between several CCD pixels, which can further reduce the signal-to-noise ratio per pixel. The coupling efficiency can be improved by using fiber tapers. For example, a 4:1 taper coupled to the sensor can bring an active area up to 32×32 mm² and provide an effective light transmission of <5%. However, this coupling efficiency is still too low for reliably detecting single X/gamma ray interactions (at ~30 keV). Furthermore, using tapers with aspect ratios greater than 3:1 can also introduce considerable optical distortions.

In one embodiment of a detector design of the present disclosure, an electrostatic de-magnifier (DM) tube can be used instead of fiber tapers or relay lenses, for coupling scintillation light onto an EMCCD sensor. The DM tube can be a first generation image intensifier having a quantum efficiency (QE) of ~7% at around 550 nm wavelength. Unlike using fiber taper, the use of the DM tube can provide an enlarged active area with a fixed photon gain. When a large de-magnification ratio (DM ratio) can be used between the actual detection area and the active area of a readout sensor. However, a spatial resolution at an input window of the DM tube can be inversely proportional to the DM ratio.

Figure 4:
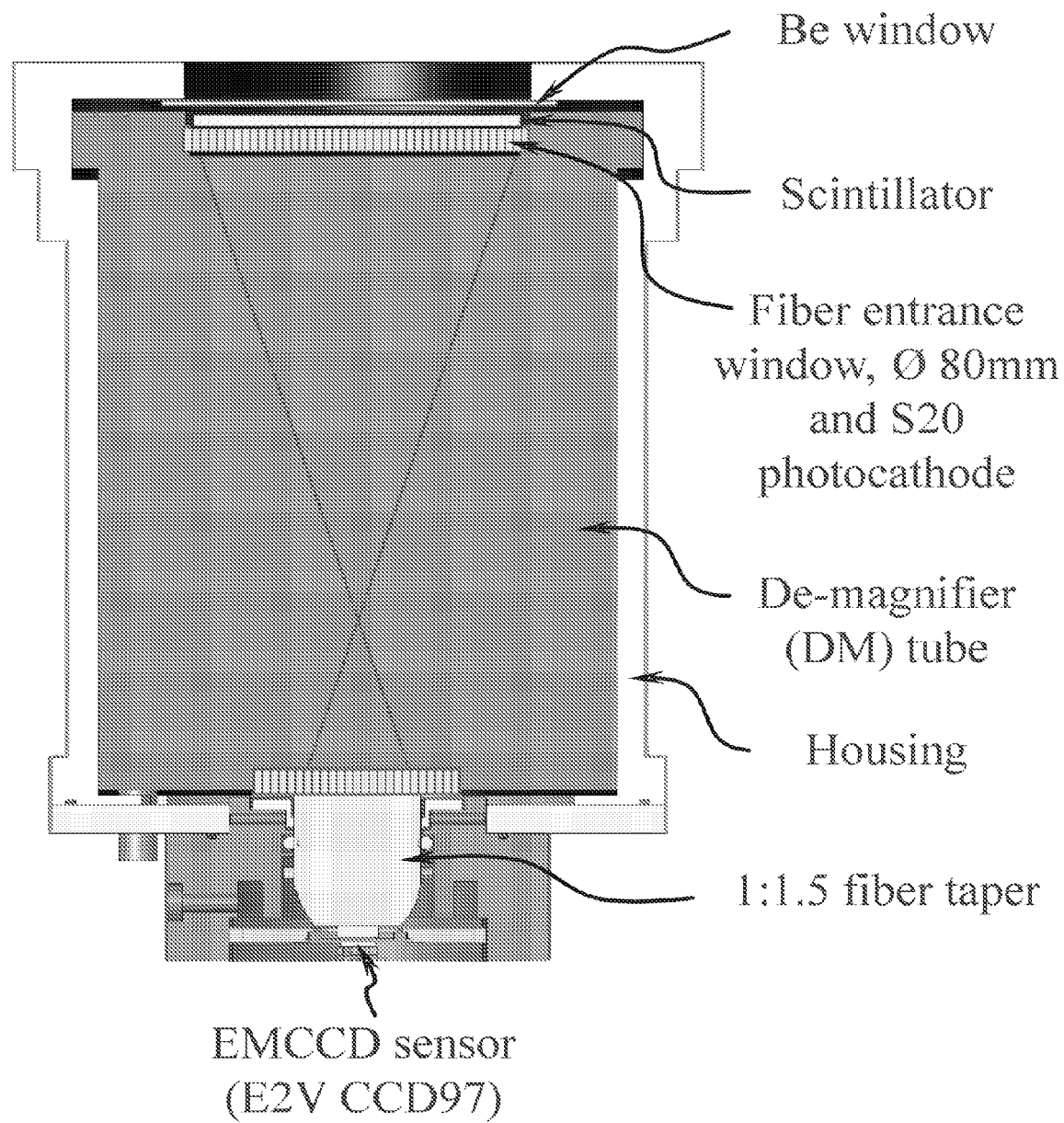
FIG. 4 depicts an illustrative embodiment of a prototype ultra-high resolution gamma camera based on an EMCCD sensor and a DM tube.

A large DM ratio can also lead to significant distortions at an edge of the FOV. In one embodiment, a moderate DM ratio of 4:1 can be applied. The output of the DM tube can be coupled to the EMCCD sensor through a 1.5:1 fiber taper. A total detection active area on the phosphor of ~50×50 mm² can arise from this approach. The active area can be extended to cover up to an 80 mm diameter by using a larger DM ratio. This can leave a minimum dead area of ~1.5 cm wide around the detection area. An illustrative schematic of a gamma camera is shown in FIG. 4. In an embodiment of the present disclosure, a Gadox phosphor of ~80 μm thick can be used for converting the 27~35 keV X/Gamma rays into visible photons. Several other scintillation materials, such as columnar CsI(Tl), can be used. The EMCCD sensor used in the illustration of FIG. 4 is an E2V 97 series L3 Vision Electron Multiplication CCD. This sensor has 512×512 pixels and each pixel is 16×16 μm² in size. This sensor is a back-illuminated frame transfer device. It operates at up to 10 MHz so that an effective frame rate of 32 fps can be achieved at full resolution. The sensor can normally operate at −40° C. to reduce dark current.

To extract gamma ray interactions from a frame acquired, a local maxima in the frame can be located. An array of 3×3 to 5×5 pixels (depending on the binning scheme used) can then defined around each peak position. The energy of an interaction is derived by summing signals from all pixels in the corresponding group, while an interaction position is estimated by simply centroiding over the same group of pixels.

Signal-to-Noise Ratio and Energy Resolution

For each 27~35 keV photon energy deposited in the phosphor, ~600 scintillation photons are generated (the light yield of the Gadox phosphor can be assumed to be ~22,400 photon/MeV). Considering that only a fraction of these photons can exit from the phosphor and the Q.E. of the photocathode is as low as 5~7%, approximately ~10 photoelectrons can be expected to be emitted from the photocathode. The DM tube used can have a gain of ~60 photons/photoelectron, which leads to around 600 photons emitted from its output window per event. After taking into account a transmission of the fiber taper and a quantum efficiency of the EMCCD sensor, a number of electrons generated on the EMCCD is a Poisson random variable with a mean of ~100 electrons. These electrons can typically spread over 4×4 or 5×5 pixels. Such a signal can be weak for a standard CCD readout at 10 MHz, but it is more than plenty for an EMCCD sensor to handle. A conversion efficiency λ can be defined, which is a mean number of electrons generated on the EMCCD sensor for a single photoelectron on the DM photocathode. For the detector of FIG. 4, λ can be ~10. A variety of conversion efficiencies λ can be achieved by using tapes of different sizes between the DM tube and the EMCCD sensor.

An internal gain of EMCCD sensors can be a stochastic process. For fixed n electrons at an input of the multiplication stage, a number of electrons at an output (m) can follow a distribution, $$p_n(m) = \frac{m^{n-1} \cdot e^{\frac{m}{G}}}{G^n \cdot (n-1)!} \quad (1)$$

where G is the electron multiplying (EM) gain. With the input signal $S_{in}$ being a Poisson random variable, the output signal $S_{out}$ can have a mean $$E[S_{out}] = G \cdot S_{in} \quad (2)$$

and standard deviation $$\sigma[S_{out}] = \sqrt{\left[2 \cdot (G-1) \cdot G^{-((N+1)/N)} + \frac{1}{G}\right] \cdot G^2 \cdot S_{in}} \quad (3)$$

$$\approx \sqrt{2 \cdot G^2 \cdot S_{in}}$$

Figure 5:
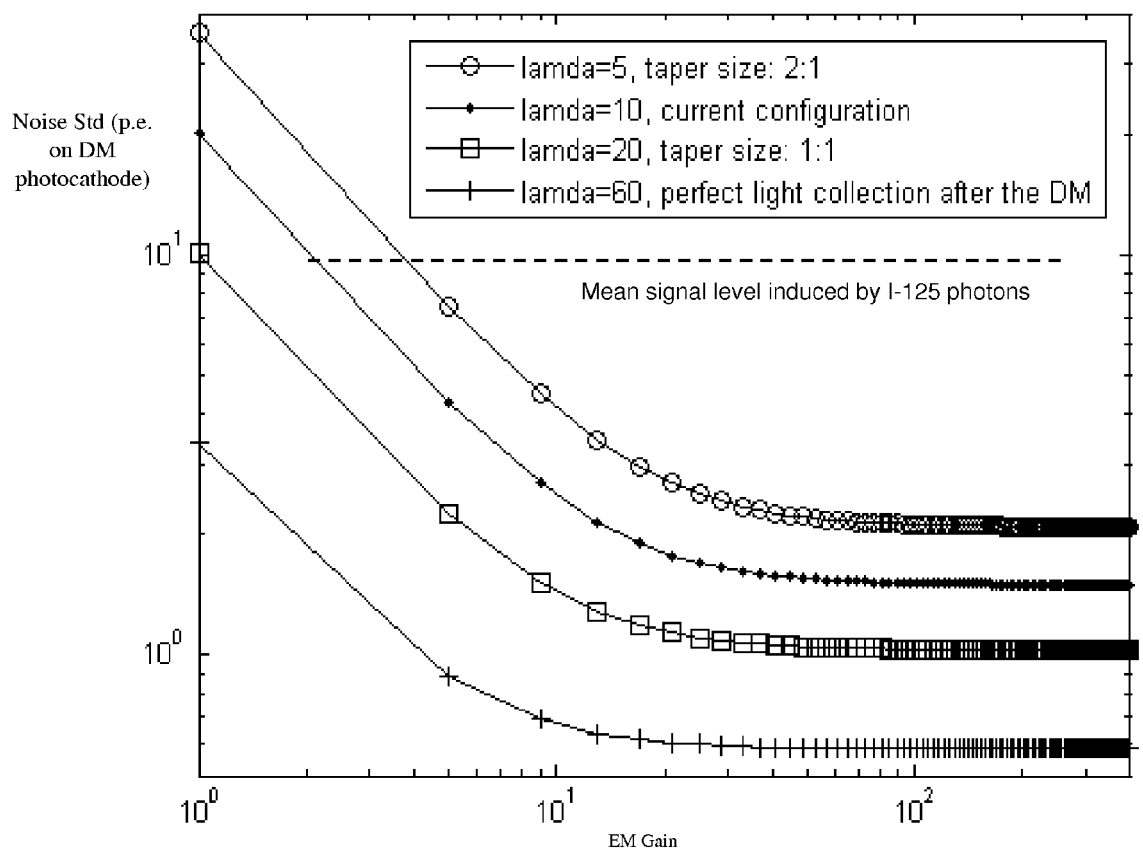
FIG. 5 depicts an illustrative embodiment of a readout noise for a given signal of 10 p.e.s on a DM photocathode. λ is the conversion efficiency from photoelectrons (on DM) to electrons on CCD.

(for large $N$ and $G$)

where N can be the number of multiplying registers in the EMCCD, which is 550 in the sensor used in the detector of FIG. 4. Considering the spurious noise charge generated during the transfer of charge through the device (i.e. the clock-induced charge, CIC) and thermal dark noise as in standard CCDs, an overall readout noise for a given signal $N_e$ can be described by, $$\sigma_{total} \approx \sqrt{2 \cdot (N_e + n_{pix} \cdot N_{dark} + n_{pix} \cdot N_{spurious}) + n_{pix} \cdot \frac{\sigma_{readout}^2}{G^2}} \quad (4)$$

where $n_{pix}$ is the no. of pixels included when deriving the overall signal level by summing over a local group of pixels. $N_{spurious}$ and $N_{dark}$ can be the average noise charge per pixel within a given exposure time, typically 10~30 ms. $\sigma_{readout}$ can be the readout noise of the EMCCD output amplifier. In equation (4), $\sigma_{total}$ can be given at the unit of electron on CCD before multiplication. An estimated total readout noise for a given fixed signal of 10 photoelectrons, as a function on the EM gain, is illustrated in FIG. 5. For these calculations, it can be assumed that $n_{pix}$=25 and $\sigma_{readout}$=40 e$^-$/pix. $N_{spurious}$ and $N_{dark}$ are both negligible when compared to typical amplitudes of true signals. With an EM gain of a few hundred, the total readout noise for the given signal level (~10 p.e.s) can be approximately 1 p.e.s. It follows that the energy resolution achievable with this detector is dominated by the Poisson fluctuation on the number of p.e.s generated on the DM photocathode ($\sigma$>4 p.e.s) rather than the subsequent readout noise.

While it is important to achieve an ultra-high spatial resolution of <50 μm, a good energy resolution may also be obtained with detectors having similar configurations. One possible approach is to maximize a photoelectron yield on the DM tube by depositing a photocathode directly on a thin layer of scintillator and using it as an entrance window. In principle, the photoelectron yield can be further improved by using new scintillators such as LaBr$_3$(Ce) (light-yield: 65000 ph/MeV). Even with a perfect scintillator (free of non-linearity and light-yield dependency on interaction location), it would need at least 1500 photons at 140 keV to achieve a resolution of 6%. It is expected that >10 p.e.s/keV was achieved with their setup.

Figure 6:
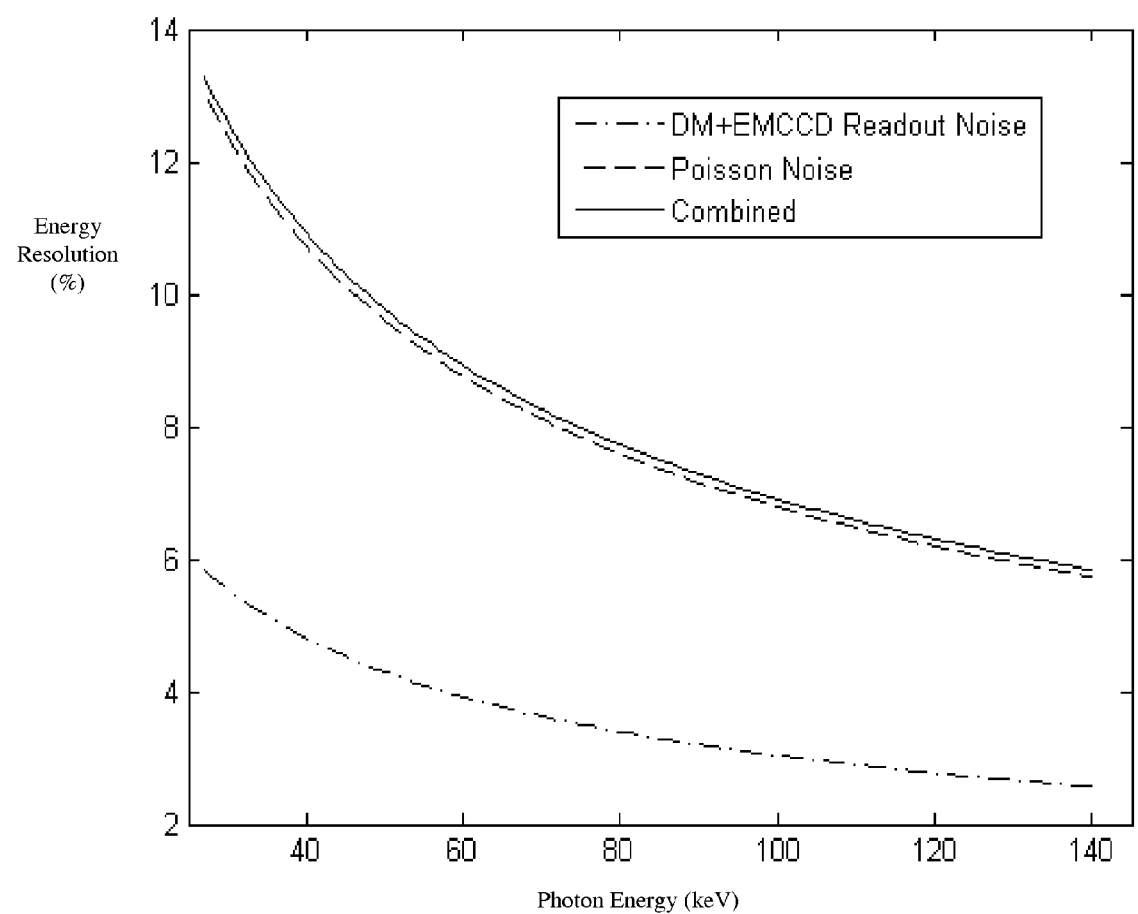
FIG. 6 depicts an illustrative embodiment of an estimated energy resolution with Poisson noise and readout noise only. A photoelectron yield of 10 p.e.s/keV was assumed for these calculations.

By utilizing a DM tube with a thin quartz entrance window with a similar photocathode and all other configurations kept the same, a light pool containing >300 p.e.s for each 30 keV deposited in the crystal can be achieved. This can greatly improve a signal-to-noise (SNR) for detecting I-125 interactions. FIG. 6 illustrates the estimated contributions to the overall energy resolution from the Poisson fluctuation on the no. of photoelectrons and the subsequent readout noise. From this data, an energy resolution of <20% FWHM at ~30 keV and ~6% at 140 keV with the gamma camera based on a DM tube and EMCCD readout can be achieved.

X and Gamma Ray Photon Counting Capability

Figure 7:
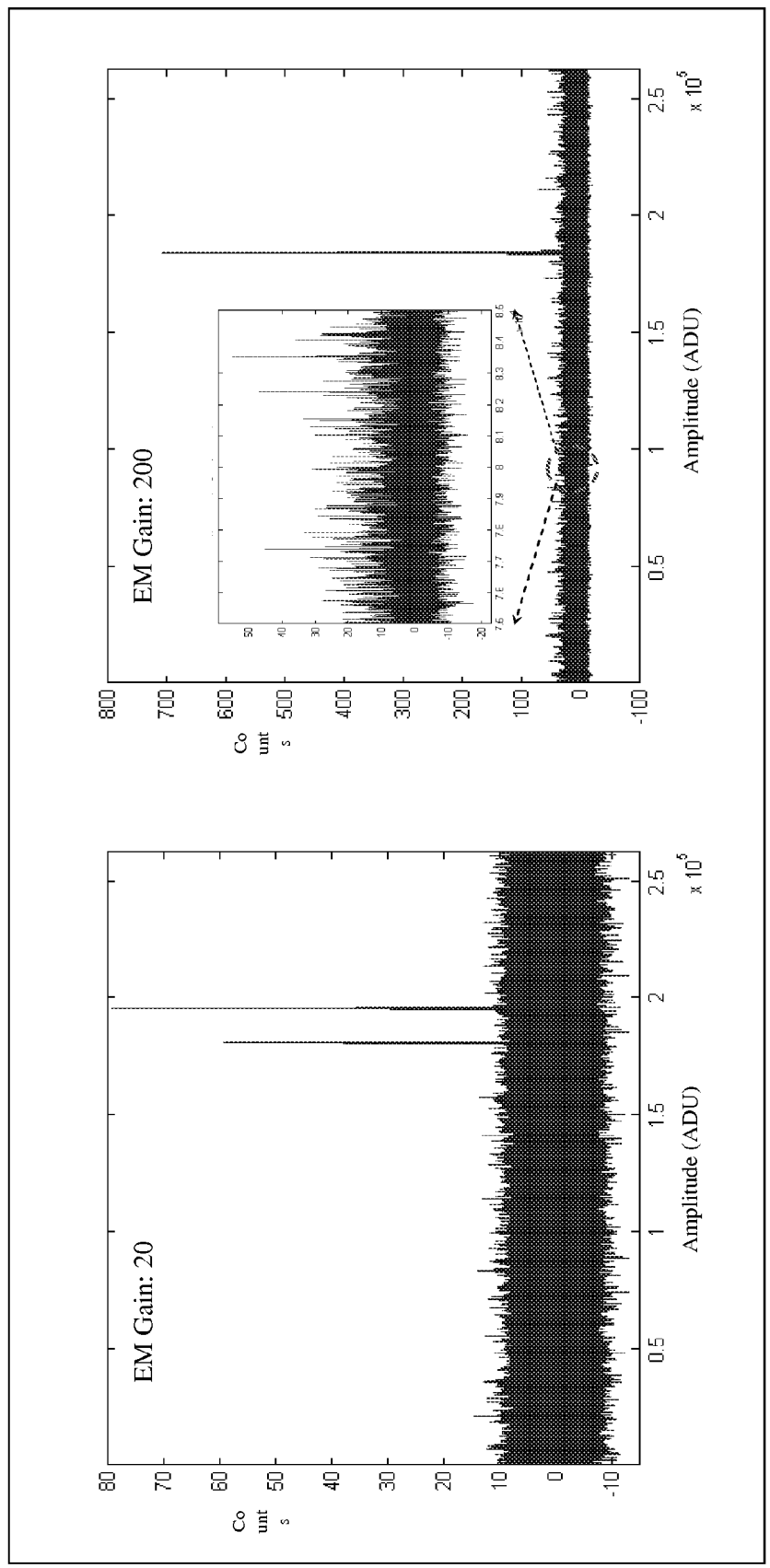
FIG. 7 depicts an illustrative embodiment of two experimentally derived frames that contain true I-125 interactions. Note that the low amplitude spikes corresponding to thermally generated photoelectrons from the DM photocathode are visible at an EM gain of 200.

Some illustrations of detected I-125 interactions are shown in FIG. 7. With a reasonable electron multiplying gain, a resulting signal amplitudes from true interactions are well above the noise. At a gain of 200, some low amplitude spikes on top of the remaining readout noise can be identified, for pixels without true signal. These can be caused by thermally generated photoelectrons on the DM photocathode, at a rate of ~50 p.e.s/sec. cm$^2$. For gamma ray photon counting applications, a threshold can be set on the summed signal from a local group of 4×4 or 5×5 pixels. At a frame rate of 30 f/s or higher, the chance of two thermally generated p.e.s falling onto the same group of pixels and within the same frame is negligible. Therefore one can set a threshold on summed signals that is just above a signal p.e. level to pick up true I-125 events. As mentioned above, a mean signal level for I-125 events is ~10 p.e.s., which should be well-separated from the signal level for dark events.

Figure 8:
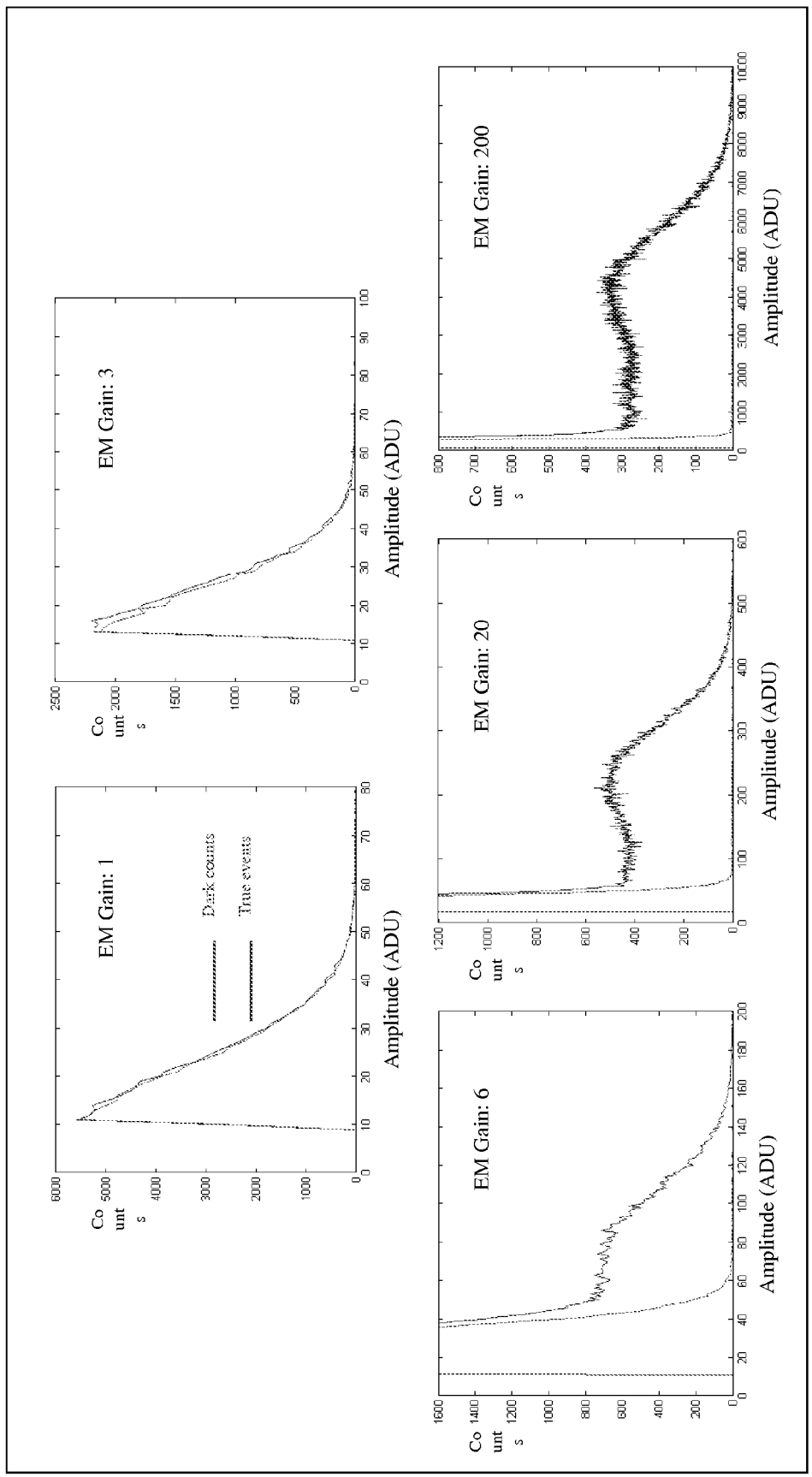
FIG. 8 depicts an illustrative embodiment of measured energy spectra for true (blue) and dark count (red) events.

To further verify the X and gamma photon-counting capability of the detector of the present disclosure, a collimated I-125 source was used to irradiate the detector. One third of its 5×5 cm$^2$ active area was exposed to the source, while the rest of the active area was shielded by tungsten sheets of 1 mm thick. Measured energy spectra with events from both shielded and open areas (normalized to the same size and exposure time) are compared in FIG. 8. Note that there is a severe low-energy tailing effect in measured spectra with true events. This is mostly caused by the variation in light yield (depending on where the gamma ray energy is deposited in the scintillator). In the Gadox phosphor used, absorption material is added to reduce light spread. As a result, scintillation photons generated further away from the exiting surface can suffer more attenuation. This effect can be reduced using a scintillator with more uniform light yield. With an EM gain of 200, one can set an energy threshold at around ⅛ of the signal amplitude for photopeak events. This should give a >90% counting efficiency for true events, with almost sure rejection of dark events. This excellent gamma ray photon counting efficiency can be very useful in SPEM applications because a true count rate may be as low as a few tens of counts per second.

Intrinsic Spatial Resolution

Figure 9:
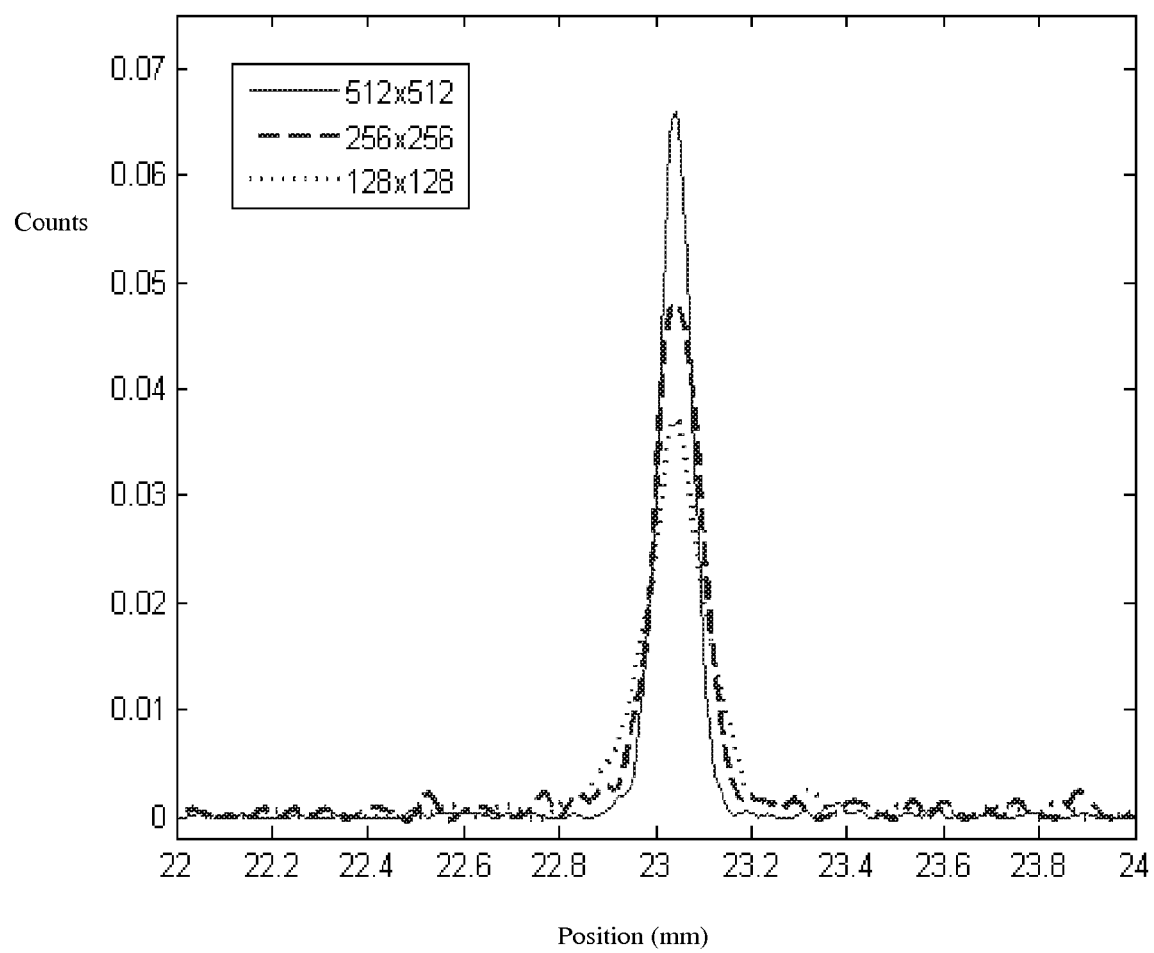
FIG. 9 depicts an illustrative embodiment of measured line spread functions with 1×1, 2×2 and 4×4 binning.

An intrinsic spatial resolution of the detector of FIG. 4 was measured with an I-125 spherical source of 500 μm diameter, placed 10 cm away from the detector. A slit collimator made of tungsten of 1 mm thick was placed right on top of the scintillator. The slit opening on the collimator was ~25 μm wide. For this measurement, =different binning schemes were used when reading out the EMCCD sensor. The use of 2×2 and 4×4 binning improved the readout frame rate from the standard 32 fps to 50 fps and 95 fps respectively. This helps to reduce the probability of event overlapping at a high count rate. However, binning does lead to poorer spatial resolution due to the enlarged optical pixel size on the detector. The measured line response functions are shown in FIG. 9. After taking off the effects of source dimension and slit width, the measured intrinsic spatial resolution of the detector is shown in Table 2.

Note that when reading out the detector with 512×512 pixels, the intrinsic spatial resolution achieved can be around 60 μm full-width-at-half-maximum (FWHM), which is slightly worse than the target (<50 μm). In this prototype detector, a Gadox phosphor was used for converting gamma rays into visible photons. This scintillator can be wet power applied on the input window of the DM tube. Its polycrystalline structure can lead to a relatively wide light spread. Results in Table 2 show that even with 4×4 binning and the resultant 384×384 μm$^2$ pixel size, one can still get a good spatial resolution of 119 μm FWHM. This indicates that the light spread in the scintillator can be wide enough to cover at least 2×2 pixels or an area of 800×800 μm$^2$. To further improve the spatial resolution, other scintillators can be used that are either brighter or have better controlled light spread, such as columnar CsI(Tl) or thin disk of YAP or LaBr$_3$(Ce). As previously discussed, it is possible to achieve more than 10 p.e.s/keV, in contrast to the 0.3~0.5 p.e.s/keV.

Four Configurations of the Intensified Electron-Multiplying Charge-Coupled Device (I-EMCCD)

Below four embodiments of the I-EMCCD detector using the above principles are illustrated. Each embodiment can be an improved version of the previous one. The characteristics of these detector designs are discussed below.

Configuration I

Figure 10:
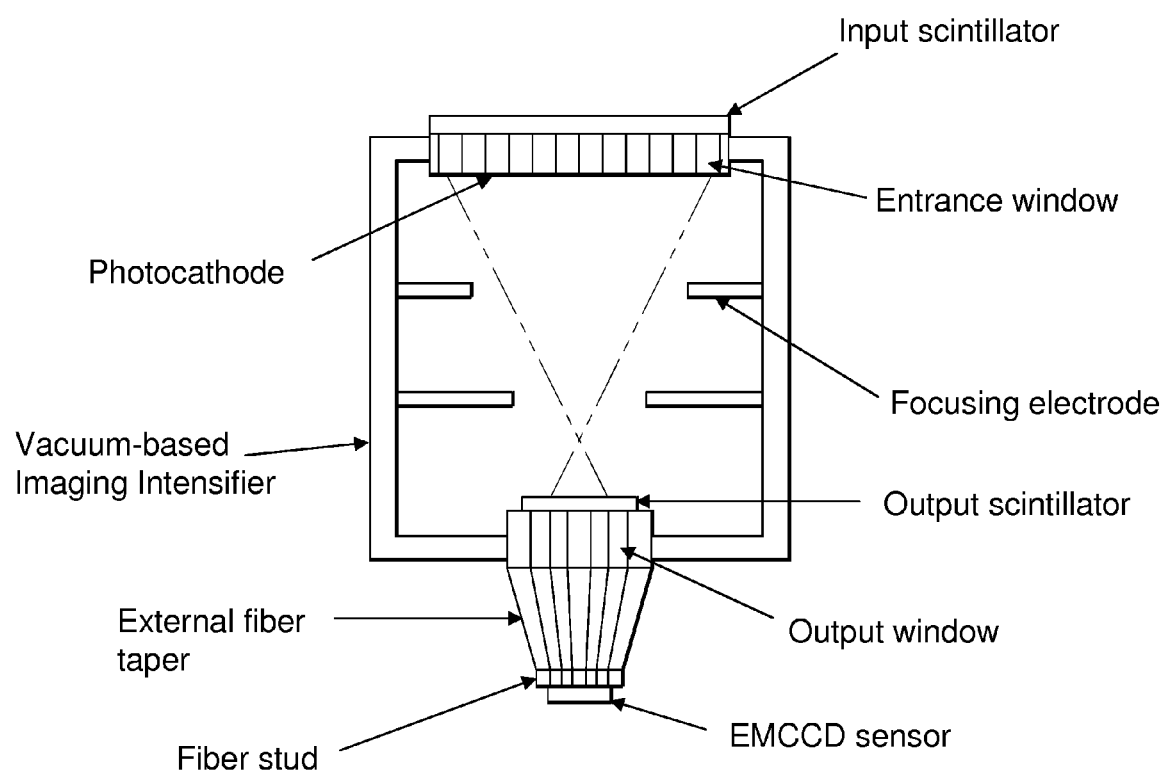
FIGS. 10-13 depict illustrative embodiments of configurations of an EMCCD detector.

A block diagram of Configuration I is illustrated in FIG. 10. In this configuration, the detector can consist of a scintillator, a first-generation image intensifier and an EMCCD camera. The output window of the intensifier can be optically coupled to the EMCCD sensor through a fiber taper and a fiber stud (used for protecting the surface of the EMCCD sensor). For detecting ionizing radiations, a basic chain of signal generation and propagation can include the following steps:

1. The ionizing radiation deposits its energy on the scintillator. This process creates visible photons in the scintillator. The number of photons created can be proportional to the energy deposition by the incident radiation.

2. Part of these scintillation photons can be converted into photoelectrons by the photocathode of the image intensifier.
3. The photoelectrons can then be accelerated by electrodes creating a potential difference inside the image intensifier.
4. When these photoelectrons reach the phosphor inside the image intensifier, they can create photons that emerge from the output window of the image intensifier.
5. Part of these photons are transmitted through the fiber taper and the fiber stud which can both be located outside the image intensifier. The photons can then be collected by the EMCCD sensor which converts these photons into electrons generating a measurable readout with associated amplifiers and an analogue-to-digital converter.

The fiber taper and fiber stud attenuate the photons emerging from the output window of the image intensifier. This in turn can lead to a reduced signal-to-noise ratio for detecting low energy ionizing radiations, such as gamma rays having energy less than a hundred keV.

Configuration II

Figure 11:
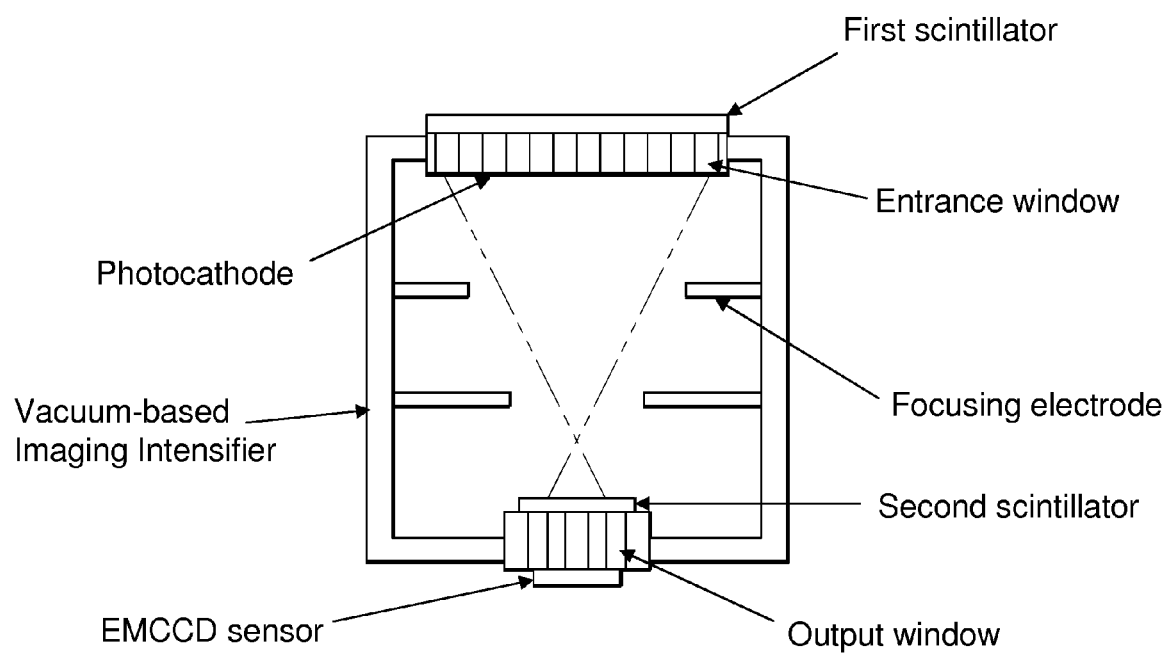

A block diagram of Configuration II is shown in FIG. 11. For detecting ionizing radiations, configuration II can be described as follows:
1. The entire camera system can consist of a scintillator, a first generation image intensifier tube (referred to as a DM tube below), and an electron multiplying CCD sensor.
2. The scintillator can be attached to the entrance window of the DM tube, which can be used to convert x and gamma ray photons and charged particles into visible photons.
3. The visible photons created in step 2 can be converted to photoelectrons on the photocathode which can be attached to the inner surface of the entrance window of the DM tube.
4. The photoelectrons created in step 3 can be accelerated by an electrical potential of 10 kV to 20 kV.
5. These accelerated photoelectrons can then bombard a phosphor which can be attached on the inner surface of the output window of the DM tube. This process can lead to the emission of visible photons that emerge from the output window of the DM tube.
6. The visible photons emerging from the DM tube can then be detected by an EMCCD sensor that can be directly coupled to the output window of the DM tube.

The foregoing embodiment can lead to an improved coupling efficiency that allows a majority of visible photons (from the DM tube) to be detected by the EMCCD sensor. This process can improve the SNR over that achieved in Configuration I.

Configuration III

Figure 12:
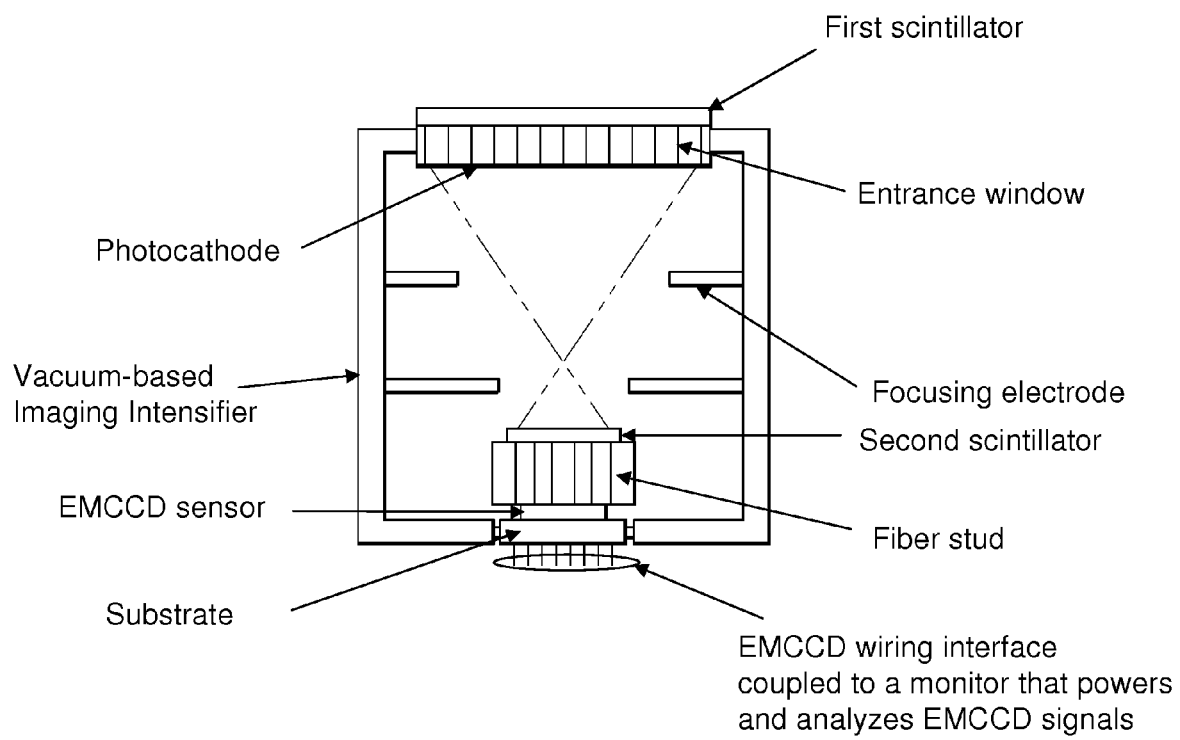

A block diagram of Configuration III is shown in FIG. 12. For detecting ionizing radiations, configuration III can be described as follows:
1. The entire camera system can consist of a scintillator, an adapted first generation image intensifier tube (referred to as a DM tube below), and an electron multiplying CCD sensor that is coupled to a scintillation phosphor supported by a substrate.
2. The adapted first generation image intensifier can be a vacuum housing assembly
3. The EMCCD sensor, with an attached scintillation phosphor, can be placed at least in part inside the vacuum of the DM tube.
4. The scintillator can be attached to the entrance window of the DM tube, which can be used to convert x and gamma ray photons and charged particles into visible photons.
5. The visible photons created in step 4 can be converted to photoelectrons on a photocathode that can be attached to the inner surface of the entrance window of the DM tube.
6. The photoelectrons created in step 5 can then be accelerated by an electrical potential of 10 kV to 20 kV.
7. These accelerated photoelectrons can then bombard the phosphor attached to the EMCCD sensor. This process can lead to the emission of visible photons in the phosphor.
8. These visible photons can be detected by the EMCCD sensor.

By placing the EMCCD sensor inside a vacuum of the DM tube, the DM tube output window can be eliminated. The light attenuation through the window can be removed from the signal propagation, which leads to a further improved SNR over Configuration III.

Configuration IV

Figure 13:
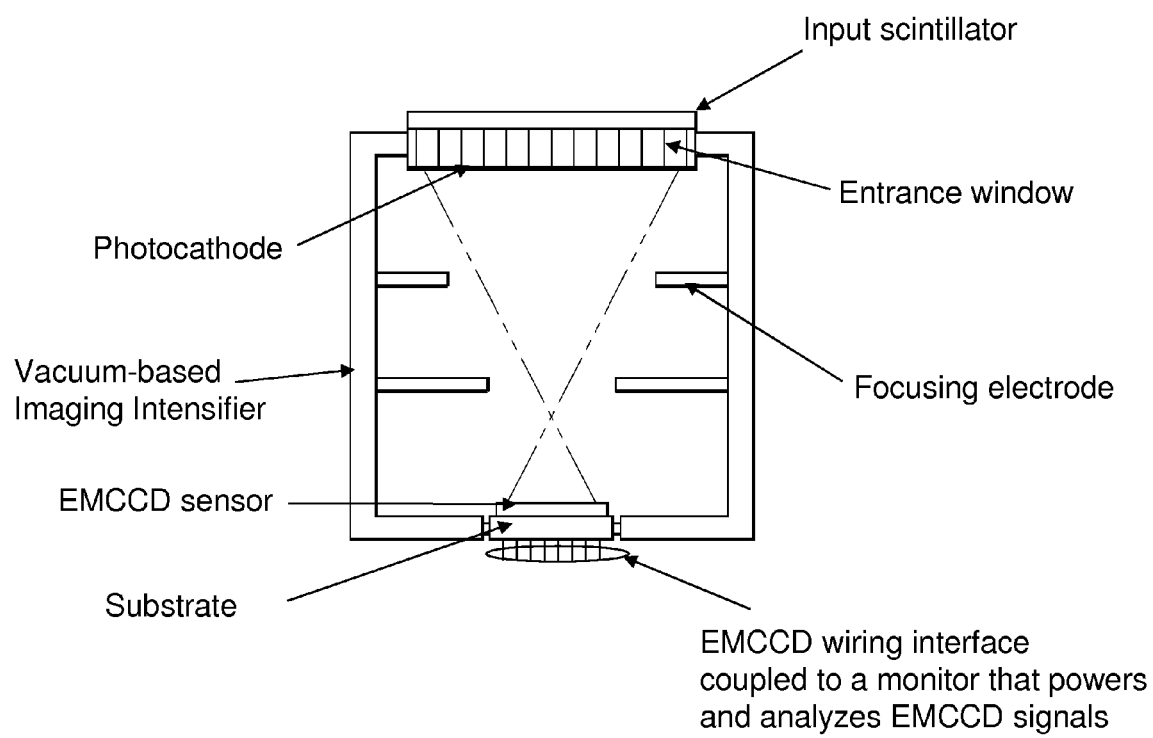

A block diagram of Configuration IV is illustrated in FIG. 13. For detecting ionizing radiations, configuration III can be described as follows:
1. The entire camera system can consist of a scintillator, an adapted first generation image intensifier tube, a bare electron multiplying CCD sensor that can be placed inside a vacuum of the DM tube, and supported by a substrate.
2. The adapted first generation image intensifier can be a vacuum housing assembly.
3. The EMCCD sensor can at least in part be located in a vacuum tube and used for detecting the photoelectrons emitted by the photocathode.
4. The scintillator can be attached to the entrance window of the DM tube, which can be used to convert x and gamma ray photons and charged particles into visible photons.
5. The visible photons created in step 4 can be converted to photoelectrons on the photocathode which can be attached to the inner surface of the entrance window of the vacuum tube.
6. The photoelectrons created in step 5 can then be accelerated by an electrical potential of 10 kV to 20 kV.
7. The accelerated photoelectrons can then bombard the EMCCD sensor. Each photoelectron in turn can create a large number of signal electrons (several hundreds to 5000 depending on a potential difference applied between the photocathode and the EMCCD sensor).

The electron bombardment on EMCCD sensor can create a large signal of several thousands electrons over an electronic noise of typically a few electrons. This can lead to a high SNR even for detecting signals containing a few photoelectrons. The high SNR can also help to improve a spatial resolution of the system.

Figure 14:
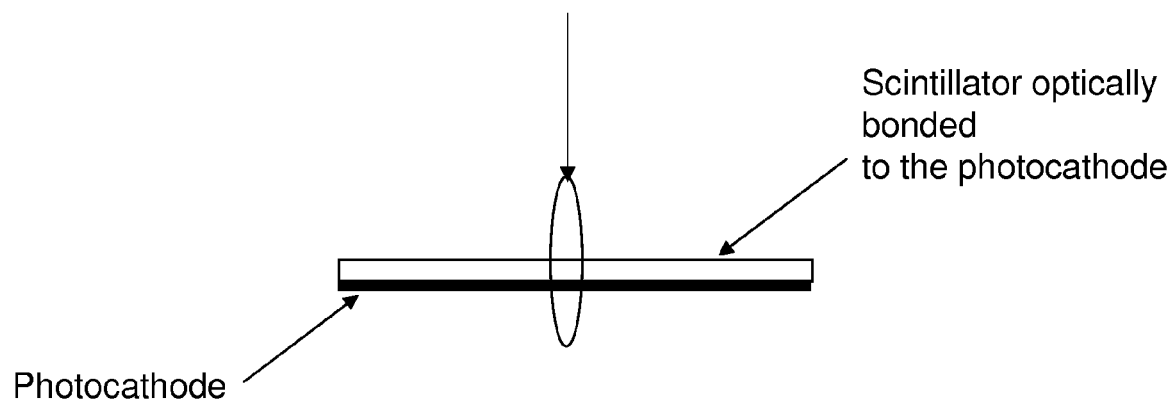
FIG. 14 depicts an illustrative embodiment of a scintillator and photocathode.

An additional embodiment of the scintillator and photocathode is illustrated in FIG. 14.

From the foregoing descriptions, it would be evident to an artisan with ordinary skill in the art that the aforementioned embodiments can be modified, reduced, or enhanced without departing from the scope and spirit of the claims described below. For example, an EMCCD monitor utilizing common computing and software application technology can be coupled to any one of the above embodiments of an I-EM-CCD detector to monitor, process and/or present numerical and graphical interpretations of signals supplied by said detector. Generally speaking, the principles described in the present disclosure can be applied in whole or in part to any ionizing radiation sensor not just those described in the above embodiments.

Other suitable modifications can be applied to the present disclosure. Accordingly, the reader is directed to the claims for a fuller understanding of the breadth and scope of the present disclosure.

Figure 15:
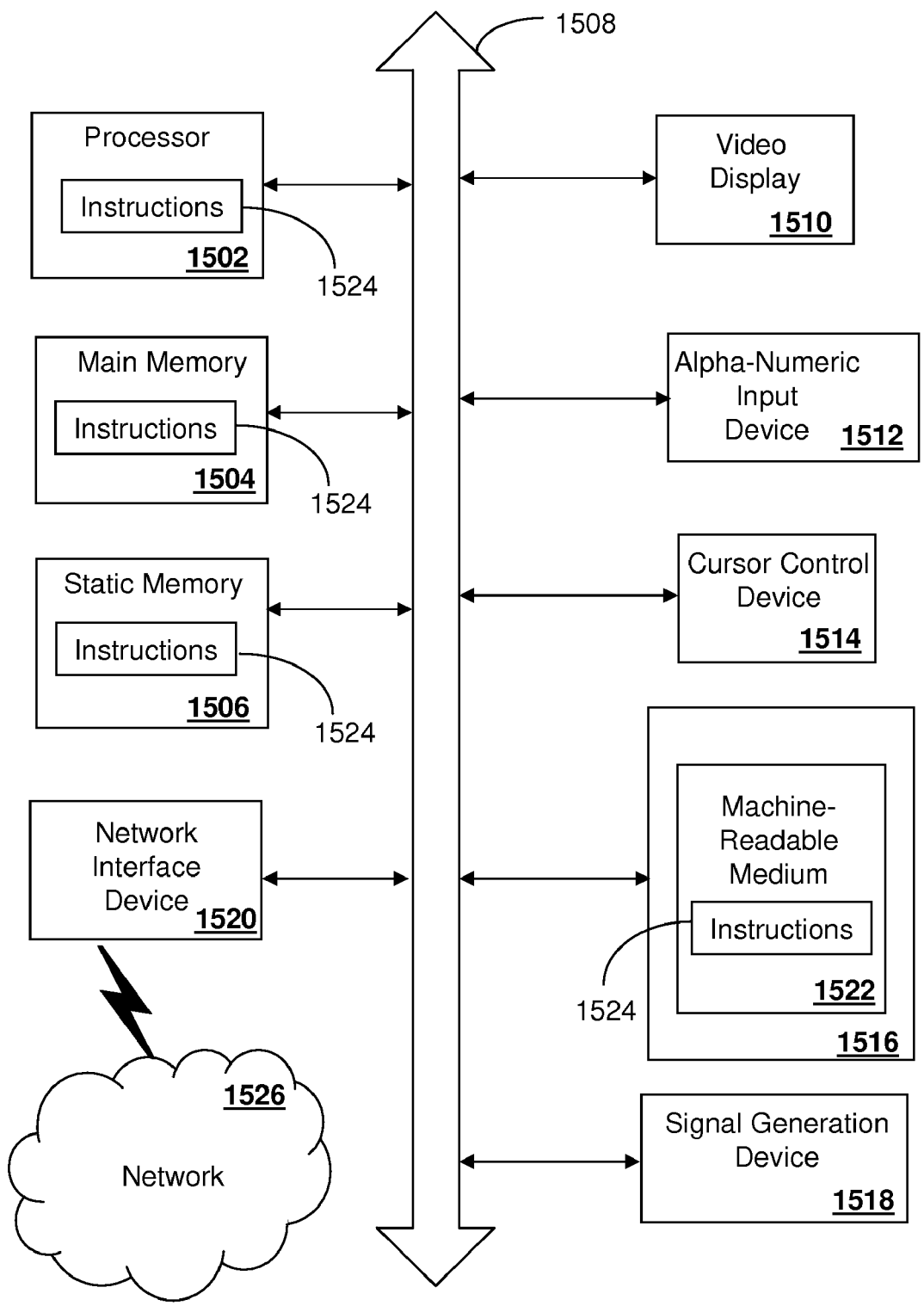
FIG. 15 depicts an illustrative diagrammatic representation of a machine in the form of a computer system within which a set of instructions, when executed, may cause the machine to perform any one or more of the methodologies disclosed herein.

FIG. 15 depicts an exemplary diagrammatic representation of a machine in the form of a computer system 1500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, a solid state display, or a cathode ray tube (CRT)). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a machine-readable medium 1522 on which is stored one or more sets of instructions (e.g., software 1524) embodying any one or more of the methodologies or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1524, or that which receives and executes instructions 1524 from a propagated signal so that a device connected to a network environment 1526 can send or receive voice, video or data, and to communicate over the network 1526 using the instructions 1524. The instructions 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

TABLE 1

| | Size of the Pinhole or Ring-hole Openings | Sensitivity w/ 150/216 openings |
|---|---|---|
| Pinhole | Ø 200 μm | 0.06%/0.0864% |
| Pinhole | Ø 250 μm | 0.09%/0.13% |
| Pinhole | Ø 300 μm | 0.13%/0.187% |
| Ring-hole | Ø 1.5 mm, 100 μm wide | 0.9%/1.3% |
| Ring-hole | Ø 2.0 mm, 100 μm wide | 1.2%/1.78% |
| Ring-hole | Ø 1.5 mm, 150 μm wide | 1.8%/2.59% |
| Ring-hole | Ø 2.0 mm, 200 μm wide | 2.4%/3.5% |

TABLE 2

| EMCCD Binning | Readout Frame Rate (fps) | Optical Pixel Size (μm) | FWHM (μm) | FWTM (μm) |
|---|---|---|---|---|
| 512 × 512 | 32 | 96 | 60 | 123 |
| 256 × 256 | 54 | 192 | 92 | 190 |
| 128 × 128 | 95 | 384 | 119 | 227 |

What is claimed is:

1. An ionizing radiation sensor, comprising:
   a first scintillator for generating photons from incoming ionizing radiation;
   an imaging intensifier for amplifying the photons;
   an electron-multiplying charge-coupled device (EMCCD) coupled to the imaging intensifier for sensing the amplified photons generated by the imaging intensifier; and
   a vacuum assembly, wherein the EMCCD is located inside a vacuum housing assembly, and wherein a substrate supports the EMCCD in the vacuum housing assembly and is structurally part of the vacuum housing assembly to form a vacuum seal.

2. The ionizing radiation sensor of claim 1, wherein the first scintillator is optically bonded to an entrance window of the imaging intensifier.

3. The ionizing radiation sensor of claim 1, wherein ionizing radiation comprises at least one among X-rays, gamma rays, charged particles, and neutrons.

4. The ionizing radiation sensor of claim 1, wherein the first scintillator comprises one among a columnar CsI(Tl) phosphor, a Gadox phosphor located in active area of imaging intensifier, a polished plate of Yttrium Aluminum Perouskit doped with $Ce^{3+}$, a polished plate of Lutetium Oxyorthosilicate doped with $Ce^{3+}$, $LaBr_3$ crystal optically bonded on an entrance window of the imaging intensifier, and $LaCl_3$ crystal optically bonded on an entrance window of the imaging intensifier.

5. The ionizing radiation sensor of claim 1, wherein the imaging intensifier comprises one among a first generation imaging intensifier, and a second generation imaging intensifier.

6. The ionizing radiation sensor of claim 1, wherein the vacuum housing assembly has an entrance window, and wherein the imaging intensifier comprises:
   a photocathode located in the vacuum housing assembly that emits electrons when illuminated by the photons generated by the first scintillator;
   a plurality of focusing electrodes located in the vacuum housing assembly that accelerate the electrons towards the EMCCD when an electrical potential is applied to said plurality of focusing electrodes; and
   a second scintillator that converts the electrons to the amplified photons.

7. The ionizing radiation sensor of claim 6, wherein the vacuum housing assembly has a geometric shape corresponding to one among a cylindrical shape, and a hexagonal shape.

8. The ionizing radiation sensor of claim 6, wherein the imaging intensifier corresponds to a de-magnifier (DM) tube.

9. The ionizing radiation sensor of claim 6, wherein the first scintillator is located outside of the vacuum housing assembly on or near an outside surface of the entrance window.

10. The ionizing radiation sensor of claim 6, wherein the first scintillator is located inside of the vacuum housing assembly on or near one among a surface of the photocathode and an inside surface of the entrance window.

11. The ionizing radiation sensor of claim 6, wherein the first scintillator is located inside of the vacuum housing assembly, and wherein the first scintillator comprises a crystal deposited on the photocathode.

12. The ionizing radiation sensor of claim 6, wherein the photocathode is located on or near an inner surface of the entrance window.

13. The ionizing radiation sensor of claim 6, wherein the entrance window comprises a fiber optic plate.

14. The ionizing radiation sensor of claim 6, wherein the vacuum housing assembly comprises an output window that receives the amplified photons, and wherein the EMCCD is located outside the vacuum housing assembly on or near an outside surface of the output window.

15. The ionizing radiation sensor of claim 14, wherein the output window comprises a fiber optic plate.

16. The ionizing radiation sensor of claim 6, wherein at least a portion of the EMCCD is located on or near the second scintillator.

17. The ionizing radiation sensor of claim 16, comprising a fiber coupling positioned between the second scintillator and the EMCCD.

18. The ionizing radiation sensor of claim 17, wherein the substrate has an inner surface electrically coupled to the EMCCD, and an outer surface that supplies a plurality of signal connections associated with the EMCCD.

19. The ionizing radiation sensor of claim 18, wherein the substrate comprises a printed circuit board (PCB) with a plurality of contacts on each of the inner and outer surfaces of the PCB.

20. The ionizing radiation sensor of claim 6, wherein the electrical potential applied to the plurality of focusing electrodes ranges between 10 kilo Volts (kV) and 20 kV.

21. The ionizing radiation sensor of claim 6, wherein the second scintillator comprises one among a columnar CsI(Tl) phosphor, a Gadox phosphor located in active area of imaging intensifier, a polished plate of Yttrium Aluminum Perouskit doped with $Ce^{3+}$, a polished plate of Lutetium Oxyorthosilicate doped with $Ce^{3+}$, $LaBr_3$ crystal optically bonded on an entrance window of the imaging intensifier, and $LaCl_3$ crystal optically bonded on an entrance window of the imaging intensifier.

22. The ionizing radiation sensor of claim 6, wherein the vacuum housing assembly has a vacuum between 10 Torrs and −5 Torrs.

23. The ionizing radiation sensor of claim 1, wherein the EMCCD is cooled by a cooling system.

24. The ionizing radiation sensor of claim 23, wherein the cooling system comprises a Peltier cooling system.

25. An ionizing radiation sensor, comprising:
a scintillator for generating photons from incoming ionizing radiation;
an imaging intensifier for generating accelerated electrons from the photons;
an electron-multiplying charge-coupled device (EMCCD) coupled to the imaging intensifier for sensing the accelerated electrons generated by the imaging intensifier; and
a vacuum assembly, wherein the EMCCD is located inside a vacuum housing assembly, and wherein the EMCCD is structurally part of the vacuum housing assembly to form a vacuum seal.

26. The ionizing radiation sensor of claim 25, wherein the EMCCD operates at or near ambient temperature.

27. The ionizing radiation sensor of claim 25, wherein the vacuum housing assembly has an entrance window, and wherein the imaging intensifier comprises:
a photocathode located in the vacuum housing assembly that emits electrons when illuminated by the photons generated by the scintillator; and
a plurality of focusing electrodes located in the vacuum housing assembly that accelerate the electrons towards the EMCCD when an electrical potential is applied to said plurality of focusing electrodes.

28. The ionizing radiation sensor of claim 27, wherein the vacuum housing assembly has a geometric shape corresponding to one among a cylindrical shape, and a hexagonal shape.

29. The ionizing radiation sensor of claim 27, wherein the scintillator is located outside of the vacuum housing assembly on or near an outside surface of the entrance window.

30. The ionizing radiation sensor of claim 27, wherein the scintillator is located inside of the vacuum housing assembly on or near one among a surface of the photocathode and an inside surface of the outside window.

31. The ionizing radiation sensor of claim 27, wherein the scintillator is located inside of the vacuum housing assembly, and wherein the scintillator comprises a crystal deposited on the photocathode.

32. The ionizing radiation sensor of claim 27, wherein the photocathode is located on or near an inner surface of the entrance window.

33. The ionizing radiation sensor of claim 27, wherein the entrance window comprises a fiber optic plate.

34. A method, comprising:
generating from a scintillator photons from incoming ionizing radiation;
generating from an imaging intensifier accelerated electrons from the photons;
coupling an electron-multiplying charge-coupled device (EMCCD) to the imaging intensifier for sensing the accelerated electrons generated by the imaging intensifier; and
creating a vacuum seal around the EMCCD, wherein a portion of the EMCCD contributes to the vacuum seal.

* * * * *